United States Patent [19]

Regalbuto

[11] 4,088,258
[45] May 9, 1978

[54] APPARATUS AND METHOD FOR VACUUM HOT PRESS JOINING, COMPACTING AND TREATING OF MATERIALS

[75] Inventor: John A. Regalbuto, Fort Worth, Tex.

[73] Assignee: General Dynamics Corporation, Fort Worth, Tex.

[21] Appl. No.: 706,032

[22] Filed: Jul. 16, 1976

Related U.S. Application Data

[62] Division of Ser. No. 430,857, Jan. 4, 1974, Pat. No. 3,971,875.

[51] Int. Cl.² ............................................. B23K 19/00
[52] U.S. Cl. ...................................... 228/193; 29/420; 219/243; 228/44.1 R; 228/243; 228/263; 266/250
[58] Field of Search ................... 228/44.1 R, 44.1 A, 228/193, 194, 195, 243, 263; 100/93 P; 219/243; 13/31; 29/420; 266/905, 252, 250

[56] References Cited

U.S. PATENT DOCUMENTS

| | | | |
|---|---|---|---|
| 3,033,973 | 5/1962 | Herbert | 219/243 X |
| 3,093,104 | 6/1963 | Bukata | 228/44.1 R |
| 3,256,598 | 6/1966 | Kramer et al. | 228/193 |
| 3,550,254 | 12/1970 | Greenspan et al. | 228/243 X |
| 3,670,397 | 6/1972 | Lewis | 228/193 X |

Primary Examiner—Al Lawrence Smith
Assistant Examiner—K. J. Ramsey
Attorney, Agent, or Firm—Charles E. Schurman

[57] ABSTRACT

Apparatus and method for joining, compacting and thermo-mechanically processing materials under controlled application of heat and evenly distributed mechanical pressure in a vacuum or inert gas environment, having particular usefulness in diffusion bonding, powder metallurgy, vacuum brazing and materials treatment. One or more workpieces or materials are pressed, joined, formed or treated by placing them in a reusable or permanent type, closable chamber having a movable wall portion, the same and/or other wall portions having a bellows construction. The chamber is evacuated and heated and the movable wall portion of the chamber evenly displaced towards an opposing portion of the chamber with concomitant bellows deformation of chamber wall portions operatively connected with the movable wall to provide for application of mechanical force to the materials in a substantially even distribution across the work by means of forcible inward movement of the movable chamber wall operatively pressing upon the materials to be joined or compacted.

11 Claims, 13 Drawing Figures

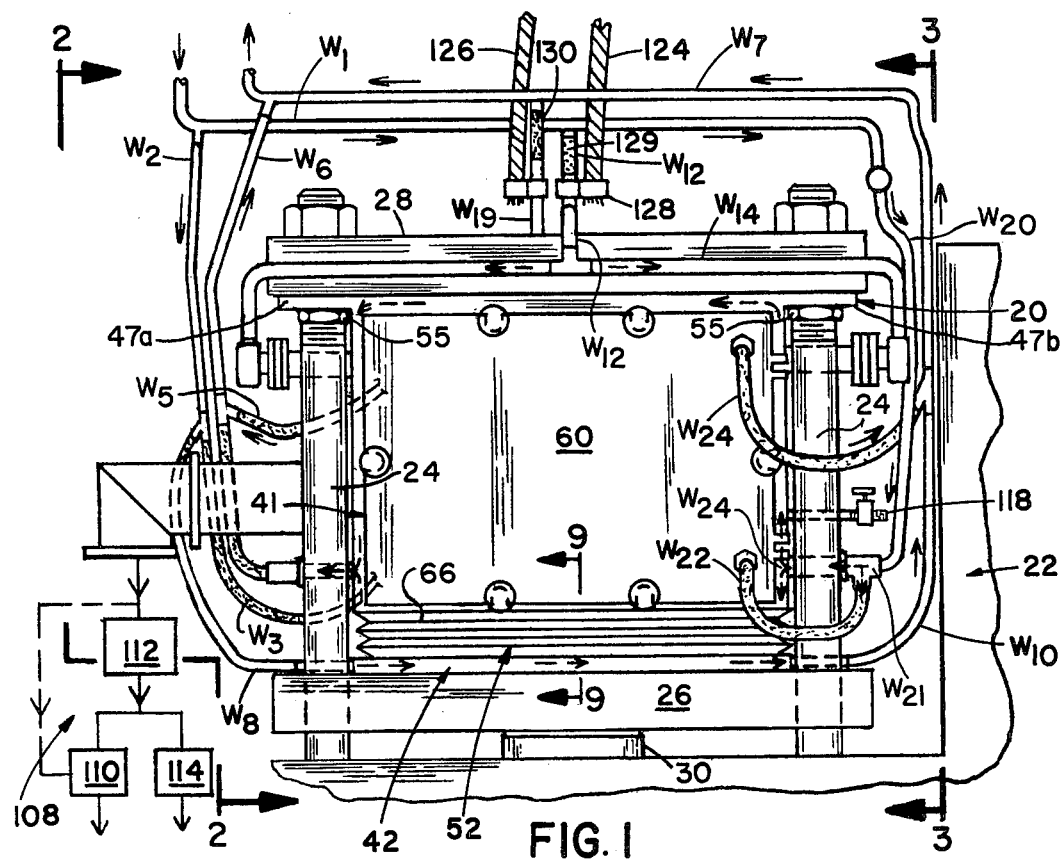

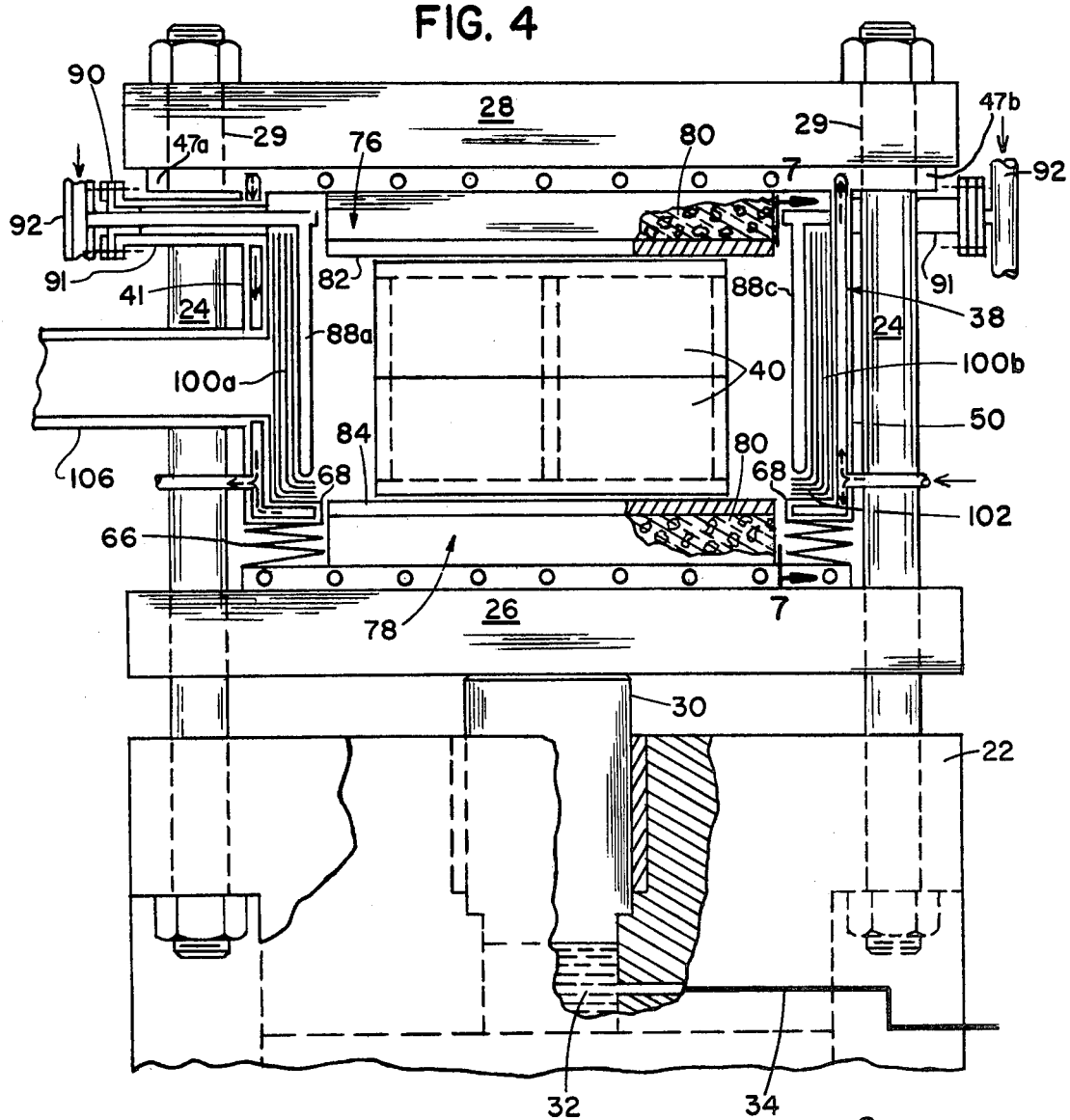

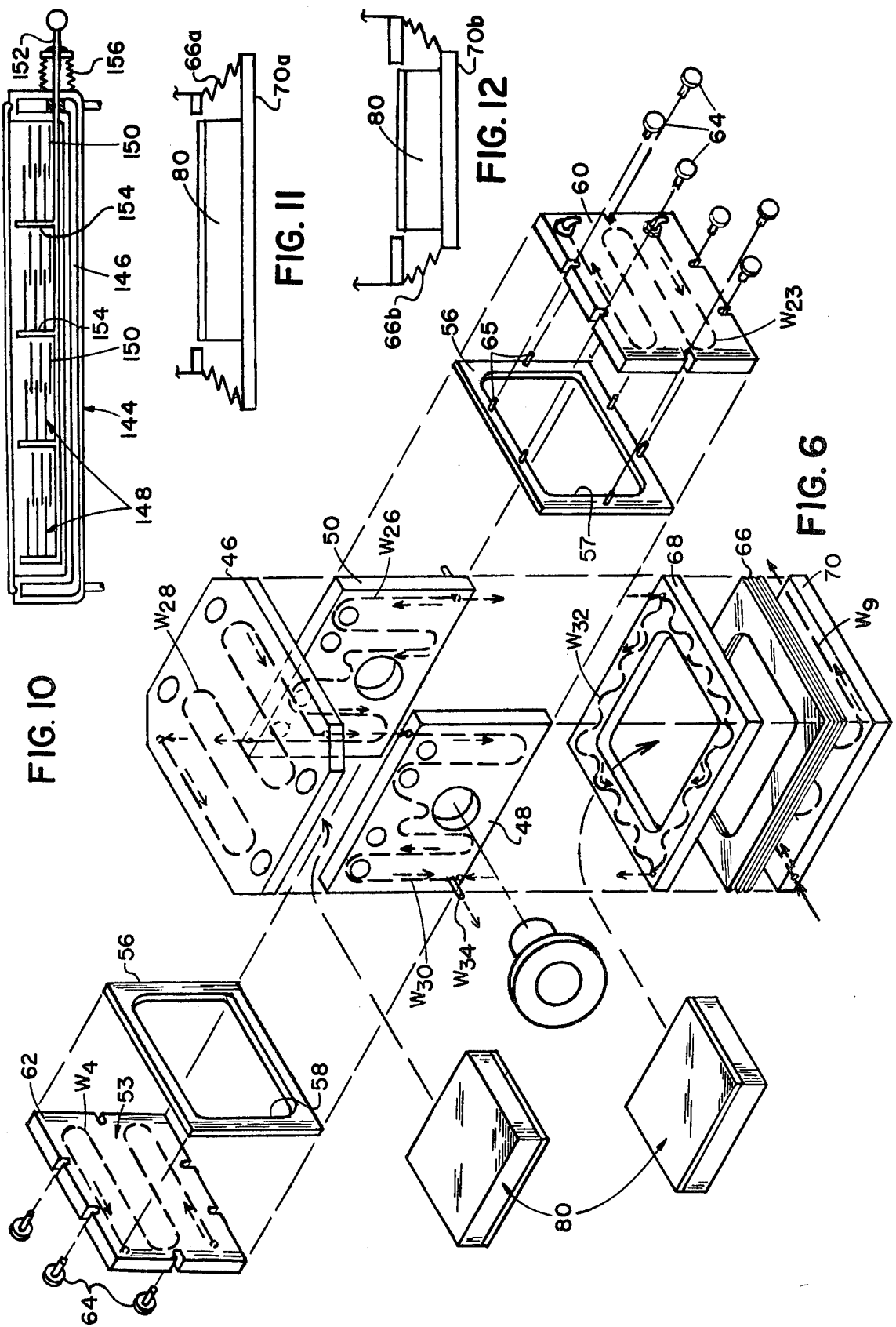

APPARATUS AND METHOD FOR VACUUM HOT PRESS JOINING, COMPACTING AND TREATING OF MATERIALS

This application is a division of pending application Ser. No. 430,857, filed Jan. 4, 1974 now U.S. Pat. No. 3,971,875.

BACKGROUND OF THE INVENTION

The present invention relates generally to apparatus and method for vacuum hot pressing of materials, particularly metals, under high temperatures in a vacuum or inert gas environment within a permanent type enclosure or chamber and subjecting the materials to an evenly distributed pressure provided over a relatively large work area with respect to the chamber interior.

As the need for lighter and/or stronger materials has advanced, particularly in such areas as aerospace constructions, interest has heightened in the technology of metal pressing, compacting and joining materials for the fabrication of parts and in metal treating such as, for example, diffusion bonding, powder metallurgy, vacuum brazing and thermo-mechanical processing of materials. Prior to the present invention several methods with attendant apparatus had been evolved for these purposes. There are, though, numerous and inherent disadvantages in the prior systems often leading to expensive and deleterious results. Thus, in the cases of certain materials it is desirable to work or subject them to pressing force with high values of force per unit area uniformly applied to the work or materials acted on over a relatively substantial work area and under high vacuum or inert gas environment at elevated temperatures. However, prior known equipment for properly doing so over any substantial or practically useful work area has been unduly expensive, sometimes requiring complicated methods, plural furnace chambers, or non-reusable or non-permanent type equipment components. Also, such prior equipment often has been of undesirably large or bulky construction or has a utilizable enclosed work area disproportionately small to the size of the enclosure or the associated press apparatus. In consequence, the capital expense has sometimes been so large as to impede growth in these technologies.

One attempt to overcome these drawbacks utilizes a vacuum furnance chamber having its wall penetrated by a small diameter ram (compared to the plan area of the work area acted upon) attached to a pressure distributing platen within the chamber and forming part of or acted on by the ram of an associated press apparatus in order to apply pressure to the workpiece within the chamber. Such construction requires that heavy and bulky backup supports to such internal movable platen be included within the vacuum chamber to provide distribution of the ram thrust over the platen and thus the work or workpiece area, since high heat within the furnace may otherwise distort the platen with resulting uneven pressure on the work so as to yield unsatisfactory results such as non-uniformly bonded materials. That construction, therefore, increases the size of the furnace chamber required to handle a given size or lot of workpieces or material. Available work space is also decreased and disproportionate costs incurred with respect to the size of the materials worked on. Moreover, there are self-evident difficulties of sealing the chamber wall against vacuum loss or gas leakage where it is penetrated by the ram.

Another method utilizes vacuum retort apparatus in the form of an envelope or chamber welded from thin metal sheet to hermetically contain the workpiece and is evacuated, sealed, heated externally, for example, by placing the envelope within a larger furnace, after which the heated retort is transferred to a press apparatus. There the workpiece is pressed upon by permanently deforming the retort which is then necessarily destroyed to gain access to the materials within. Obviously, such sheet metal retort technique suffers from the short life of the retort due to its single use, the further requirement of complete inspection of welds therein to insure vacuum tightness and a complexity of tooling required to align the enclosed work or workpieces with the pressure exerting portions of the press.

The present invention very largely overcomes the difficulties of such prior art methods and apparatus.

SUMMARY OF THE INVENTION

By the present invention there is provided a vacuum hot pressing apparatus or device in the form of an easily operated, reusable, permanent type vacuum furnace or chamber having openable and closable access means and a relatively large available interior work area with respect to chamber size. It can be constructed as a part of or as removable adjunct equipment to conventional open bed or similar type presses and the method thereby practiced so as to supply an even distribution of pressing forces over substantially the full plan area of the chamber interior.

It has been found in accordance with one object of this invention that such vacuum hot pressing apparatus, providing for the method herein taught of joining, compacting and treating of materials, can be produced to supply the substantially evenly distributed pressure over a relatively large available work area when pressing force distribution is accomplished primarily outside the chamber and remote from the hot zone. in this manner, the press bolsters or platens, columns therefor and ram or other pressure exerting means operate at room temperature, providing maximum parallelism, flatness, and rigidity to the associated press apparatus platens which apply the required pressure to the chamber wall. Accordingly, the invention contemplates a furnace chamber device and method of using same in which the chamber is positionable between confronting pressure platens of an open bed press or press apparatus, the chamber adapted and having means for being repetitively opened and sealed closed for receiving and removing therefrom workpices locatable over an available work area extending substantially over the full plan area of the chamber interior, and the chamber constructed to contain both dimensionally non-changeable or stable and dimensionally changeable or non-stable sections, one movable with respect to the other. So constructed, pressing forces may be externally applied directly against the chamber wall, such as to a flat exterior face thereof, and transmitted thereby so as to be substantially uniformly distributed across the full plan area of the chamber onto the workpieces or work located therein. Advantageously, one or more such chamber sections may contain a movable wall portion forming part of the chamber wall that encloses the workpieces and be displaceable towards the chamber interior by and in the direction of the pressing force applied thus to effect the desired even application of pressure to the work.

An object of the invention, achieved hereby, is to distribute pressing forces evenly over a large workpiece relative to the size of and containable within the furnace chamber by virtue of its large interior work receiving space relative to its exterior dimensions.

Also, the chamber wall may incorporate a bellows arrangement, advantageously rectangular in shape and bounding a plan area approximately equal to or geater than that of the plan area of the chamber interior. Beneficially the bellows in arranged and positioned in the chamber to be protected in large part from directly radiated heat from electrically or inductively energized heating element means provided in the chamber for raising the temperature of the workpieces as required, with the bellows joined to the movable wall portion. This provides reliable, repetitively reusable, simplified construction and a free positional displacement of the bellows when acted on by the ram or other pressure exerting means of the associated press, e.g., with forces to be applied to the workpieces. The heating element means, advantageously has fluid cooled pass-through and supporting connections at the chamber wall. Means such as conduits communicating between the chamber interior and the exterior provide for producing within the chamber a chemical reaction inhibiting environment such as by evacuating air and gases from the chamber interior through the conduits using vacuum producing means such as pumps, or by supplying inert gas into the chamber. Yet another object achieved by the invention is heat insulation and pressure transmission within the chamber by means of ceramic platens, beneficially a silica, and/or by composition metal plate and ceramic block platen means.

An additional object of the invention achieved as herein is provision for maintaining the strength of the substantially all metal furnace enclosure wall subjected to high heat, by coolant fluid flowed internally of the walls and in combination with both radiant heat shielding and ceramic insulation.

Still another object achieved by the inventive concepts taught herein is rapid, controlled cooldown of the workpiece by means including one or more packs of spaced apart radiation heat shields, portions of the same being movable to provide a variably reflective heat shield and further provide a variable exposure of heat sink surface area within the chamber for such control. In conjunction thereto it has been found advantageous to controllably vary the rate of coolant for increased cooldown rate and/or close control of temperature in the chamber.

By the present invention workpieces can be placed into the furnace chamber through openable and closable access means in the form of an opening or port in a dimensionally stable portion of the chamber and closure means therefor, such as an access door, sealed over the access after closing by clamping the door over the opening. A chemical reaction inhibiting environment is then produced in the chamber about the work materials by drawing a vaccum thereon or by introduction of inert gas as may be desirable and the materials then heated to the desired high temperature level. Pressing forces are then applied to the materials in a substantially even distribution across their full pressed upon faces by inward movement of the movable wall portion to effect the desired joining, compacting or treating of the materials.

BRIEF DESCRIPTION OF THE DRAWINGS

The foregoing and further advantages and objects of the invention will become more apparent to those skilled in the art upon an understanding of the annexed description and drawing containing preferred embodiments of the invention given by way of example only and not as limitative of the inventive concepts herein and in which:

FIG. 1 is a front elevational view of a vacuum hot press device of this invention showing the furnace chamber positioned in a four column press and having connection for supplying electrical energy, cooling water, inert gas and for drawing a vacuum on the chamber;

FIG. 2 is a side elevational view of the hot press device of FIG. 1 as seen from the left side thereof along line 2—2;

FIG. 3 is an elevational side view of the vacuum hot press device of FIG. 1 as seen from the right hand side thereof and taken along line 3—3 thereof;

FIG. 4 is a section view in elevation of the section hot press device of FIG. 1 taken along line 4—4 of FIG. 2;

FIG. 6 is an exploded schematic view in perspective of the furnace chamber of FIG. 5 indicating cooling water passages and flow therein;

FIG. 7 is an elevational view of the portion of a face of the pack of radiation heat shields showing the heating elements positioned thereover and taken along line 7—7 of FIG. 4;

FIG. 8 is a cross-sectional view of one of the pack of radiation heat shields taken along lines 8—8 of FIG. 7;

FIG. 9 is an enlarged cross-sectional view through the bellows midway of corners thereof showing the inward deflection of the bellows leaves when the furnace chamber is under vacuum;

FIG. 10 is a plan view in section horizontally through an alternate embodiment of an access door of the furnace chamber of this invention showing slidable radiation heat shields therein;

FIG. 11 is an alternate embodiment of a bellows arrangement which can be utilized in a furnace chamber of the invention; and FIG. 12 is a further alternate embodiment of a bellows arrangement utilizable in a furnace chamber of this invention.

DESCRIPTION OF THE PREFERRED EMBODIMENTS

Figure 5:
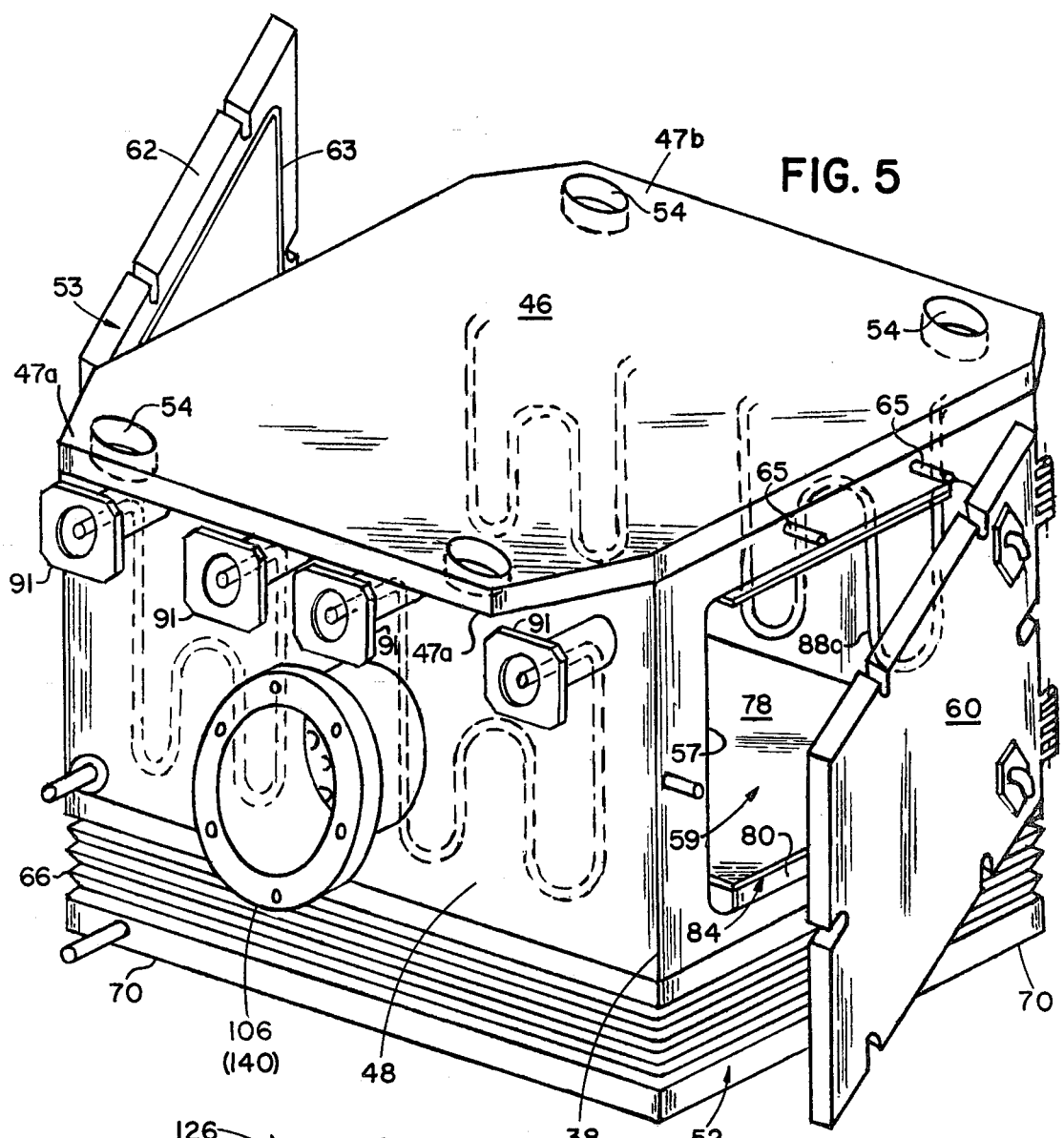
FIG. 5 is a perspective view of a furnace chamber of this invention showing the access doors in open position and indicating how the heating elements are positioned.

Referring to the drawings, a vacuum hot press device or apparatus of this invention is indicated generally at 20 operationally positioned in the daylight portion of an associated open bed type press 22. The press or press apparatus is of conventional type having four pressure and guide columns 24 in rectangular arrangement for evenly guiding the movable lower or pressure applying press platen 26 of the press in substantially total parallelism with and upward under pressure towards its oppositely positioned or confronting upper or fixed press platen 28. Both press platens are of like rectangular size. The lower press platen has the usual guide column apertures 29 on which the platen can slide when it is pressed upward by a ram 30 of the press that is extensible under pressure from hydraulic fluid contained in reservoir 32 located in the base or platen and column support portion of the press. The press includes a hydraulic fluid feed line 34 to the reservoir and known associated additional piping and controls (not shown) for operating the press and effecting the desired up or down movement of the lower platen 26. In this manner pressing force can be applied in a direct or mechanical manner to whatever is to be compressed between the upper and lower press platens. (See FIGS. 1–4.)

Vacuum hot press device 20 has a reusable or permanent type furnace enclosure or chamber 38 formed as a substantially rectangular, water coolable and box-like enclosure for receiving therein the workpieces or materials 40 to be joined, compacted or thermo-mechanically processed. Chamber 38 is constructed to have an upper, fixed dimension or dimensionally stable chamber section 41 in sealed attachment generally about its lower perimeter to generally the upper perimeter of a lower, variable dimension or dimensionally non-stable chamber section 42. The upper stable chamber section is formed as a rigid, metallic box-like structure including a chamber top wall or wall portion 46 provided with left and right outward extending support flanges 47a and 47b. The stable section also contains the upper portions of the chamber left and right side wall portions or walls 48 and 50 and chamber front and rear wall or wall portions 52 and 53. The flanges each contain a pair of front and rear chamber positioning apertures 54 which receive threaded upper portions of the press guide columns 24 so that the upper face of top wall 46 and thus the chamber can be secured against the upper press platen 28 between left and right pairs of columns 24 using threaded positioning nuts 55.

Each of the front and rear wall portions 52 and 53 include a narrow frame 56 with a large access opening 57 and 58 respectively therein selective for loading and unloading into and from the interior of the furnace chamber of the workpieces of materials 60 to be worked or acted upon during the working of them or operational cycle (such as by joining, compacting or thermo-mechanically processing the same). It will be seen that the access openings are large relative to the elevational area of the front and rear wall and the front and rear areas of the enclosed work space or area 59 surrounded by the chamber as best seen in FIGS. 5 and 6. Each such opening is provided with a somewhat larger area closure or access door 60 and 62 respectively that forms a major portion of its respective wall portion 52 and 53. Each door is provided with a suitable O-ring seal 63 for engaging the respective frame portion of the front and rear walls around the access openings so that when the doors are closed and dogged down by clamps 64 securable to stud bolts 65 on the chamber a substantially gastight seal is made between the doors and their frames thus sealing the chamber closed.

Joining together chamber sections 41 and 42 horizontally around their peripheries and forming lower portions of the left, right, front and rear wall portions of the enclosure is a rectangular ring-like metallic bellows 66. The bellows is sealed around its upper edge to a heat insulative ring-like flange plate 68 of the upper chamber section and around its lower edge to a rigid, plate-like bottom or lower wall or wall portion 70 of the chamber. It will be apparent that the bottom wall is movable up and down with the bellows and together therewith forms the dimensionally non-stable section 42.

Bellows 66 is constructed from a series of rectangular, flat ring-like plates or leaves 72 of stainless steel juxtaposed and welded together along their alternating adjacent inner and outer peripheral edges in the axial direction of the bellows. The leaves when thus joined form pleats which provide for the required expansibility and contractibility in the bellows and for dimensional variation in the vertical direction of lower chamber section 42. Flange plate 68, which is operatively connected and sealed to the lower edge of the upper dimensionally stable section 41 forms a radially inward directed lower edge extension of the chamber upper section 41 and the upper portions of the front, side and rear walls hereinbefore described.

When the top wall portion 46 is secured against the lower surface of the upper press platen 28 it will be evident that so held the non-stable section 42 and the portions of the chamber enclosure wall formed thereby can be changed in vertical dimension or height as the bellows is expanded or contracted. Thus, when the lower face of the movable bottom wall 70 is engaged by the upper surface of the lower press platen 26 and press ram 30 thrust upward or retracted downward the entire non-stable section 42 can be moved with such platen up or down.

The furnace chamber 38 is provided interiorly with a pair of upper and lower pressure and heat distributing plates 76 and 78 for receiving between them the workpieces 40 with associated tooling, if any, (not shown) for holding the workpieces in position during work operations. Each plate is constructed as a composite of a thick block 80 of ceramic material, in this case silica, with a thick cover plate or metal cap 82. The distributing plates attached by tab means (not shown) to the interior of the chamber and directly abut the inner faces of the respective upper and bottom walls thereof. Metal cap 82 has a lesser thickness than the insulating silica block 80 and provides means for taking up heat supplied within the chamber and distributing the same uniformly across the work area 59 of the chamber interior so as to supply heat evenly to workpieces positioned therein. The cap also protects silica block from fracture due to localized pressure by distributing pressure thereover from all surface areas of the work or workpieces which might otherwise apply too great a localized force per unit area to the block which might cause it to fracture.

Also within the chamber oppositely positioned at left and right-hand sides is a serpentine arrangement of front and rear pairs of like tungsten, resistance type electrical or heating elements 88a, 88b, 88c and 88d having supporting ends or extensions of copper each designated 89. The elements supply the necessary furnace heat when electrically energized from a source not shown. The heating elements make external connection through the side walls of the chamber by having their outboard ends 89 that are near the chamber doors insulatively supported and sealed in bushing seals 90 within outboard heating element pass through fittings 91 which are sealed in the chamber side walls. The outermost tips of the elements are joined in heat transfer relation to outboard ones of water coolable heat transfer fittings each designated 92. Inboard ends of the heating elements also extend for support and electrical continuity through the chamber side walls sealed in like inboard ones of the heating element pass-through fittings 92. Inboard ends of the heating elements thus extend through the chamber walls with their outermost tips joined in heat transfer relation to inboard water coolable fittings 92 externally of the chamber as with the like outboard fittings 92. The pass-through fittings provide the necessary support for holding the heating elements in position in the chamber and the coolable fittings for preventing overheating of the walls and pass-through fittings.

Supported by attachment means (not shown) at the left and right side walls 48 and 50 between such walls and the respective pairs of heating elements 88 are respective packs of generally rectangular, sheet-like radiation sheilds 100a and 100b in L-shaped configuration. The heat shields each have a series of dimples which provide spacing to separate the sheets of each pack one from another for better insulative and heat reflective purposes. The sheets are polished on the inboard surfaces directed towards the chamber work area 59 thereof so as to reflect heat from the heating elements towards the work or materials positioned between the plates 76 and 78. Each shield further has a foot 102 turning inward under the heating elements and located between them and the flange plate 68. It will be apparent that the shields of each pack are graduated in length and nest one on the other in the angle of the adjacent shield.

Set into the approximate center of the left side wall 48 is a vacuum connection or conduit 106 in open communication with the interior of furnace chamber 38 is best seen in FIGS. 4 and 5. Also, edges of the pack of heat shields 100a, 100b do not extend fully to the interior front and rear walls of the chamber which allows for passage of gases from the chamber interior through the connection or conduit 106 so as to provide a chemically non-reactive or chemical reaction inhibiting environment within the chamber such as by using vacuum pump means connected to the outlet of the vacuum conduit. Such pumping equipment or means is schematically indicated and connected as at 108 the pumping means comprises a piston type roughing pump or preliminary vacuum producing stage 110, a diffusion pump 112 and a forepump 114 interconnected therewith. The interconnections are made with the usual piping and valving arrangements in a known manner so that other than the arrangement indicated it is not necessary to show or describe the same in detail as such will be understood by those skilled in the arts of producing a high order of vacuum by educting gases and other boil-off from an enclosed chamber.

Connected into the right side wall 50 of the chamber is a valved off gas supply conduit or line 118 leading into the chamber from a source of high pressure inert gas (not shown) by which the chamber may be fed when desired, as by backfilling after vacuum production, and/or purging and scavaging air therefrom when the chamber is to be supplied with a wholly inert gas environment during heating and compressing of the workpieces.

In order to provide an insulative and heat sink effect in the enclosure wall of the chamber, prevent undue radiation of heat from the chamber to the ambient environment and to maintain the strength of the chamber walls under the high internal heat produced at the chamber interior the side, top and bottom walls and the access doors are provided with internal passages of conduits for conveying a calculated flow of coolant fluid, preferably water, therein under pressure from a water pumping source (not shown) so as to carry off the heat required to accomplish the necessary cooling of the chamber. The passages, conduits and the like therefor are generally indicated by broken lines where hidden and may be designated where appropriate by the letter W with subnumeral for tracing of the coolant flow. Flow arrows are also supplied in the drawings for further clarity. Thus, coolant water is supplied from the pumping source into the coolant water supply manifold $W_1$. From $W_1$ water flows in a first supply line $W_2$ where the flow divides, a portion passing via flexible tubing $W_3$ into rear access door 62. Water circulates in coolant passages $W_4$ within the door and out via flexible tubing $W_5$ and a first return line $W_6$ into a coolant water return manifold $W_7$ leading to waste. The other portion of the divided flow in $W_2$ passes via bottom wall supply tube $W_8$ into the bottom wall 70 through an inlet at the left rear side of chamber 40. Coolant flow in the bottom wall moves in serpentine coolant passages $W_9$ across and generally from rear to front of the chamber passing from the bottom wall through a bottom wall coolant exit port at the right side front into bottom wall return line $W_{10}$. The flow therein leads into water return manifold $W_7$ and to waste.

Coolant water in supply manifold $W_1$ also moves into a second supply line $W_{12}$ and passes via tee $W_{13}$ into supply header $W_{14}$, the flow dividing at the tee and a portion passing to the left to feed successively through and cool the coolable fittings 92 via coolant line $W_{15}$ at the left side wall of the chamber. From the left side rear outboard fitting 92 the water or coolant flows into a return header $W_{16}$ and passes through a tee $W_{18}$ into second coolant return line $W_{19}$ from where it moves into return manifold $W_7$ and to waste. A portion of the flow at tee $W_{13}$ also moves to the right in header $W_{14}$ then successively through the tubular portion of coolable fittings 92 via coolant line $W_{17}$ at the right side wall of the chamber and cools them. From the outboard fitting 92 at the right side rear, water passes into the return header $W_{16}$, through tee $W_{18}$ and second return line into return manifold $W_7$ and to waste.

Coolant is also supplied via manifold $W_1$ and a third coolant supply line therefrom to an inlet tee $W_{21}$. Here the flow divides, a portion passing via flexible tubing $W_{22}$ into the serpentine coolant passage $W_{23}$ within front access door 60, and out through flexible tubing $W_{24}$ from which the flow is joined with that in the return line $W_{10}$. From there it is passed into manifold $W_7$ and then to waste. The other portion of the flow into tee $W_{21}$ is directed through wall inlet $W_{24}$ communicating with a coolant passage $W_{26}$ therein. Coolant water thus enters the lower right side of the chamber through right side wall 50 near the front where the flow divides. Water moves upward in the right side wall through the serpentine coolant passage $W_{26}$ therein and moves progressively towards the rear passing therefrom up into coolant passage $W_{28}$ in the top wall 46 of the chamber via suitably placed communicating apertures. Coolant water then flows through the serpentine passage in top wall 46 exiting therefrom downward into a coolant passage $W_{30}$ within the chamber left side wall 48 near the front via communicating apertures.

Cooling water supplied into the right side wall of the chamber in addition to flowing upward through right side wall 50 also has a portion that flows down therein and exits into a coolant passage $W_{32}$ in the flange plate 68 via communicating apertures near the lower front right corner of the upper chamber section 41. A portion of the flow thus enters passage $W_{32}$ at the right-hand front portion of the flange plate where the flow therein divides, a portion moving rearward in the right side and then the rear side of the flange plate to a coolant water exit aperture opening upward into communication with the coolant passage $W_{30}$ of the left side wall 48 joining the flow therein so as to exit from the chamber through a coolant water exit $W_{34}$. Coolant flow in flange plate 68 also flows from the right front corner in the front portion of the flange plate and then rearwardly in the left side portion thereof joining the flow moving around right side and rear portions and exits therewith up into the passage $W_{30}$ and thereafter exits from the chamber through the coolant water exit $W_{34}$. From this exit the water flow moves upward through first return line $W_6$ and passes into the return manifold $W_7$ from where it flows to waste.

In general, where shown stipled in the drawings, the coolant tubes or conduits are provided of a suitable dielectric flexible rubber, vinyl or other like plastic material.

Electrical energy is supplied to the heating elements 88 from a source (not shown) through positive and negative electrical leads 124 and 126, respectively, which attach to the copper coolant water supply and return lines $W_{12}$ and $W_{19}$ leading to chamber 38 using electrical clamp 128 located on the chamber side of respective sections of insulative tubing 129 and 130 in these lines which dielectrically separate electrical current from shorting to ground. Electrical current passes along the metal conduit forming line $W_{12}$ and header $W_{14}$ to respective left and right side heating element fittings 92 nearest the chamber front and to which front portions of the heating elements 88a, b, c, and d connect for support and electrical energization. Each fitting 92 is dielectrically insulated from the chamber wall by the bushing 90. The principal radiation portion of the heating elements are disposed inward of the packs of radiation shields 100a, 100b. The electrical circuit to the elements is completed at the left side from the front fitting 92, through element 88a then through the metallic cooling water conduit in line $W_{15}$ connected between the left side inboard fittings 92 and heating element 88b then to the rearmost outboard fitting 92. From here the circuit leads to the negative or ground connection 126 via the metal coolant water return header $W_{16}$ and coolant return line $W_{19}$.

Figure 5A:
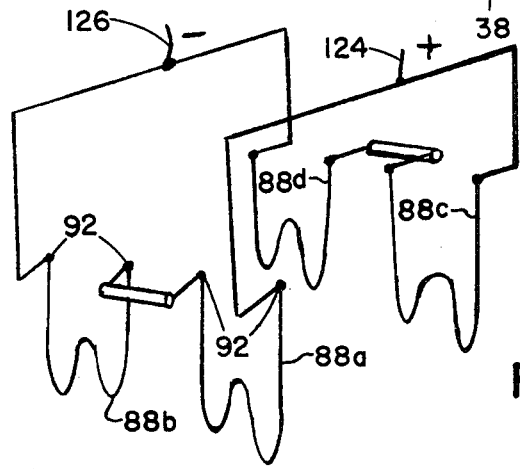
FIG. 5A is a perspective schematic view of the electrical heating element circuit.

A like electrical circuit in mirror opposite arrangement to the foregoing and connected as indicated in FIG. 5A for energizing the heating elements 88c and 88d at the chamber right side wall will now be evident in view of the above description of the left side of the circuit and comparison of drawings FIGS. 2, 3, 5 and 5A so that description of such right-hand side of the electrical circuit is unnecessary.

The method of this invention may be practiced using the herein disclosed vacuum hot press apparatus when provided with the necessary associated electrical supply, inert gas, vacuum pumps and the like for forming a complete system. Thus, other feedthroughs (not shown) leading into the chamber may be positioned in the furnace chamber wall for sensing temperature, pressure/vacuum or other conditions in the chamber. The chamber 38, when furnished as a part of associated pressure exerting means such as the above-described four column open bed press, will be positioned between the upper and lower pressure platens of the press. The chamber where furnished as a separate equipment may be positioned thereafter between such platens, usually by removing the holding nuts at the tops of the guide columns, removing the upper press platen 28 and after putting chamber 38 in place on the press lower platen 26 re-attaching upper platen 28 in an evident known manner. The various connections to the furnace chamber wall are made from the associated equipment to supply electrical energy, cooling water, inert gas, temperature and pressure/vacuum sensors and necessary vacuum within the chamber using the aforesaid vacuum producing or pump means 108.

With the furnace chamber in place between the press platens 26 and 28 and the necessary connections made thereto, one of the access doors 60 or 62 (or both) to the chamber interior is opened and the materials or workpieces to be acted upon, that is, joined, compacted or treated, placed in the chamber together with the necessary tooling (not shown) for alignment and proper pressure distribution including such tooling (not shown) as may be desired, if any, to apply a three-dimensional pressure to the material where appropriate. Such work or materials and tooling is placed upon the lower pressure and heat distribution plate 80 on its metal cap 84 (both cap plates 82 and 84 which are rectangular being secured by means not shown to their rectangular silica blocks) and the press apparatus then operated to bring the lower platen up into contact with the under side of the bottom wall 70. Thus a negligible or no pressure is brought to bear on the materials 40 and associated tooling holding the same, if any. The tooling where used is selected to properly press upon the workpieces (in some cases no tooling is required) when the top and bottom walls of the chamber are sufficiently spaced so that the bellows may further contract during the operational cycle to achieve the desired lineal percentile of workpiece deformation. The press platens 26 and 28 are then moved together by upthrust from ram 30 compressing the chamber 40 between the platens. This moves the dimensionally non-stable lower section 42, with respect to the stationary dimensionally stable upper section and compressing the bellows 66 so that the tooling with the work therein is just contacted by the faces of the cap plates 84 and 85. It will be apparent that the workpieces may be loaded into the tooling before placing the work and tooling assembly into the chamber or in some cases the work positioned in the tooling after generally arranging the latter within the chamber. The access door is then closed and then sealed gas tight over the access opening to the chamber by dogging down the clamps 64.

Selection is now made, if not priorly determined, of the type of chemical reaction inhibiting environment to be produced within the chamber. Where this is a vacuum, any open valves, e.g., purging valves, leading to the vacuum chamber, are closed and valving (not shown) to the vacuum pump means or system opened so as to place the roughing pump 110 into communication with the chamber interior. The roughing pump is then used to evacuate the chamber to approximately 100 microns of absolute pressure. The fore pump 114 is started and connected to diffusion pump 112 during the period of roughing pump action bringing the diffusion pump pressure down to the desired level following which the diffusion pump is energized after suitable cooling water flow has been established thereto. After the pressure in the diffusion pump has been lowered to approximately $10^{-5}$ torr the roughing pump is cut out and valves to the diffusion pump and fore pump operated to place these in communication with the chamber interior through vacuum connection 140 so as to evacuate the furnace chamber and stabilize it at approximately $10^{-4}$ torr. Evacuation of the furnace chamber is continued substantially continuously during materials treatment, compaction or joining. Upon stabilization of the furnace chamber at the desired internal pressure cooling water is supplied to the chamber walls, doors and the heat exchange fittings 92 at the electrical feedthroughs. The heating elements or means are then energized by supplying electrical current thereto through electrical power leads and the chamber interior thereby heated to provide the desired workpiece temperature. The pressure rise in the chamber (due to outgassing of the workpiece and/or tooling assembly) is continuously monitored and controlled so as to limit such rise and maintain the internal pressure at the desired approximately $10^{-4}$ torr. Electrical current is supplied under approximately 6-volt pressure through lead 124 at a current of about 750 amperes which is effective to produce a workpiece temperature of up to about 1700° F for the diffusion bonding of titanium (Ti 6A1-4V alloy). This temperature rise is achievable within about four to six hours and maintained in the case of such alloy for from about four to about seven hours to accomplish the diffusion bonding of one such titanium piece to another when subjected to the necessary pressure. Control means (not shown) for varying the input electrical current to the heating elements to control operational heat may also be associated with the device.

After the workpiece temperature has stabilized pressure is applied to the workpiece by actuating the press so that the hydraulic ram thereof exerts upward pressure against the lower pressure applying platen of the press. Such lower platen is guided by the four columns of the press to move upward parallel to the upward platen and thus, due to the parallel flat configuration of the chamber 38 top and bottom walls and pressure and heat distributing plates 76 and 78 and of the platens, apply an even or uniform mechanical pressure on the workpiece and tooling assembly within the chamber. Unwanted distortion is thereby minimized and the desired deformations within the workpiece tooling assembly are equalized.

Pressure is applied to the workpiece in the tooling assembly to produce a deformation versus time behavior known to produce high quality diffusion bonds. Typical bonding parameters for $T_i$ 6A1-4V alloy are 1700° F for 5-6 hours with approximately six per cent total deformation of the workpiece.

After the joining or bonding or thermal treating cycle is complete; electrical current to the resistance elements is discontinued. Pressure is discontinued when the desired deformation of the workpieces is reached. The workpiece cooling rate can be controllably varied to produce beneficial metallurgical changes in the workpiece microstructure by varying the rate and/or temperature of the cooldown. In the alternate embodiment of FIG. 10 described below this may be accomplished by actuating heat shield shutters 148 located in vertical walls of the vacuum chamber which in the alternate embodiment of FIG. 10 is a front access door.

When the desired final low temperature of the workpiece has been reached an inert gas such as nitrogen is introduced or backfilled into the chamber through a valved line and vacuum pump operation discontinued. Inert gas is supplied to the chamber to raise the pressure to ambient atmospheric and the chamber then opened to atmosphere by releasing the clamps and opening the doors. The workpiece and tooling assembly (if any) therefor are then removed from the furnace for use. The thus diffusion bonded workpiece is then subjected to a minimum of machining whereby simultaneously to remove the embrittled surface layers and achieve the desired final part configuration.

With reference to the alternate embodiment of FIG. 10 showing a horizontal section through an alternate access door 144 having a coolant water passage 146 as a heat sink therein it will be apparent that variable heat shield shutters 148 may be moved with respect to stationary heat shield shutters 150 interfitting therebetween so as to expose a variable degree of surface area of the heat sink type wall formed by the door. Movement is accomplished by slidable handle 152 having shutter supports 154 movable therewith. The handle is sealed for movement and gas tightness by a convolute 156.

Alternate embodiments of FIGS. 11 and 12 show alternate bellows 66a and 66b, respectively, indicating the bellows may be somewhat larger or smaller than the plan view of the chamber work area interior and have bottom alternate walls 70a and 70b suitably sized therefor. In FIG. 12 the construction may dispense with the angular foot on the heat shields 100 that will be apparent.

With reference to the FIG. 9 it will be appreciated that bellows 66 being formed of thin stainless steel sheet rings on the order of about 10 mils thickness and being rectangular is stiffer at the corners of the pleats so that as shown in FIG. 9 portions thereof intermediate corners of the bellows flex inward a greater degree than the corners.

The block 80 of plates 76 and 78 may be any suitable low thermal conductivity medium possessing the requisite mechanical and compressive strength, preferably about 20,000 p.s.i. failure point for the temperatures used but depending on the pressures to be used. The latter, advantageously may range from about 700 p.s.i. to about 2,000 p.s.i. depending on the materials to be joined, compacted or treated.

It will be appreciated that with the present invention a vacuum furnace chamber apparatus for hot pressing procedures can be incorporated into conventional press equipment already possessed so that in such cases initial capital expenditure for the press equipment is obviated. Moreover, the furnace chamber can be constructed to substantially any size and small units used with large press equipment if desired.

The bellows can be varied as to the number of pleats or convolutes placed above rather than below so the nonstable section is at the top, particularly if the ram presses from above and more than one bellows can be used. Combinations of sections in which plural stable or nonstable sections are present can also be used.

It is to be understood that various changes and modifications may be made all within the spirit and the scope of the inventive concepts disclosed herein without departing from the spirit and scope thereof.

What I claim is:

1. Vacuum hot press apparatus for subjecting materials to high levels of mechanical force while maintaining such materials in a heated, high vacuum environment comprising:
    a. an open bed press device having opposed pressure applying and receiving platen means for applying pressure to a workpiece therebetween;
    b. a permanently reusable, easily openable and closeable furnace chamber having a dimensionally changeable exterior wall operatively positioned between said platen means;

c. said chamber having a large interior work receiving space relative to the exterior dimensions thereof and providing for ease of operation and positioning of materials therein which are to be formed, compacted, joined or treated;

d. an access opening means positioned in a vertical portion of said exterior wall communicating with said interior and being relatively large with respect to said vertical wall portion for ease of inserting and removing workpieces into and from the interior of said chamber while it is positioned between said press platens;

e. operatively openable and closeable access door means at said opening for providing substantially gas tight sealing of the chamber interior around the materials placed therein when the door is secured over said opening;

f. means operatively connected with said chamber interior providing for producing a chemical reaction inhibiting environment within the interior of said chamber;

g. heating means in said chamber for applying heat to materials placed therein;

h. said dimensionally changeable exterior wall containing dimensionally stable and dimensionally non-stable exterior wall sections to provide for a portion of said exterior wall to be moved during use towards an opposite portion of the chamber wall so that externally applied pressing forces can be transmitted through said wall to a workpiece in said chamber;

i. whereby compressive force may be applied to materials in said chamber interior in a substantially even distribution of pressure across said materials by means of forcible inward movement of said chamber moveable wall portion when pressed inward by movement of one of the press platens against the exterior of said chamber.

2. The vacuum hot press apparatus of claim 1 wherein said furnace chamber dimensionally non-stable exterior wall section includes an expansion bellows to provide for even, inwardly displaced movement of said moveable wall portion towards the chamber interior, whereby high values of pressure from said press device may be evenly applied to said materials while they are maintained within a chemical reaction inhibiting environment producible within said furnace chamber.

3. The vacuum hot press apparatus of claim 2 wherein said expansion bellows has a substantially rectangular configuration in plan.

4. The vacuum hot press apparatus of claim 2 wherein the plan area of said bellows is approximately equal to or greater than the plan area of the working volume of said chamber interior.

5. The vacuum hot press apparatus of claim 1 wherein said press device has a plurality of columns and said chamber has at least 2 opposite sides thereof positioned between 2 oppositely positioned pairs of said columns.

6. The vacuum hot press apparatus of claim 1 in which said access opening means are two access openings positioned in opposed vertical portions of said chamber exterior wall.

7. The vacuum hot press apparatus of claim 1 in which said press device is adapted to deliver at its platens from about 700 p.s.i. to about 2000 p.s.i. pressure to a workpiece positioned therebetween.

8. The vacuum hot press apparatus of claim 1 in which said chamber exterior wall is of substantially all metal construction.

9. Method of joining, compacting or treating of titanium alloy materials to be worked under heat and mechanical pressure in a chemical reaction inhibitive high vacuum environment provided in a permanent type furnace chamber device having dimensionally stable and dimensionally non-stable enclosure wall sections and including an inwardly moveable wall portion comprising:

a. loading the materials into the interior of a reusable furnace chamber through an access opening therein having access door means therefor providing for its repetitive opening for loading and closing in order to seal the chamber substantially gas tight after each loading, the chamber device having the moveable wall portion displaceable inwardly towards an opposing portion of the chamber under the force of pressure applied externally thereto;

b. sealing the chamber by closing the access door means so as to form a substantially gas tight pressure seal over the access opening;

c. producing in said chamber a very high degree of vacuum as a chemical reaction inhibitive environment about said materials and maintaining the vacuum at about $10^{-3}$ to $10^{-4}$ torr by continuous evacuation of the chamber during the joining, compacting or treating;

d. applying heat to said materials in the chamber to bring the temperature up to about 1700° F;

e. applying pressing force to the materials by forcible inward movement of said inwardly displaceable wall portion using a compressive force of from about 700 p.s.i. to about 2000 p.s.i. and f. maintaining said materials at said temperature for from about 5 to about 6 hours at said vacuum and under said compressive force to effect the desired, joining, compacting or treating of the materials.

10. The method of joining, compacting or treating in accordance with claim 9 wherein following joining, compacting or treating of the materials, application of the compressive force and heating is discontinued and the chamber is backfilled by introduction therein of an inert gas and environmental pressure therein increased followed by opening of the chamber and removal therefrom of the materials worked on.

11. The method of joining, compacting or treating of materials in accordance with claim 9 wherein mechanical force is substantially evenly distributed across the materials pressed upon within the chamber by applying such force to the external face of the said inwardly movable chamber wall substantially evenly distributed over the full face thereof.

* * * * *